(12) United States Patent
Li et al.

(10) Patent No.: US 7,625,835 B2
(45) Date of Patent: Dec. 1, 2009

(54) PHOTOCATALYST AND USE THEREOF

(75) Inventors: Wei Li, Troy, MI (US); Se H. Oh, Troy, MI (US); Jae S. Lee, Pohang (KR); Jum S. Jang, Pohang (KR)

(73) Assignees: GM Global Technology Operations, Inc., Detroit, MI (US); Pohang University of Science and Technology, Pohang (KR)

( * ) Notice: Subject to any disclaimer, the term of this patent is extended or adjusted under 35 U.S.C. 154(b) by 334 days.

(21) Appl. No.: 11/449,037

(22) Filed: Jun. 7, 2006

(65) Prior Publication Data

US 2006/0283701 A1    Dec. 21, 2006

Related U.S. Application Data

(60) Provisional application No. 60/689,678, filed on Jun. 10, 2005.

(51) Int. Cl.
| | | |
|---|---|---|
| B01J 27/02 | (2006.01) | |
| B01J 21/00 | (2006.01) | |
| B01J 23/00 | (2006.01) | |
| B32B 5/16 | (2006.01) | |
| B32B 9/00 | (2006.01) | |
| B32B 15/02 | (2006.01) | |
| B32B 17/02 | (2006.01) | |
| B32B 19/00 | (2006.01) | |
| B32B 21/02 | (2006.01) | |
| B32B 23/02 | (2006.01) | |
| B32B 27/02 | (2006.01) | |
| C09K 11/54 | (2006.01) | |
| C09K 11/56 | (2006.01) | |
| C09K 11/66 | (2006.01) | |
| C09K 11/77 | (2006.01) | |
| C09K 11/72 | (2006.01) | |
| C09K 11/70 | (2006.01) | |
| C09K 11/02 | (2006.01) | |
| C01G 23/047 | (2006.01) | |

(52) U.S. Cl. .......... 502/216; 502/242; 502/258; 502/259; 502/350; 428/403; 428/930; 252/301.6 S; 252/301.4 R; 252/301.6 R; 252/301.6 F; 977/811; 977/812; 977/813; 423/610; 423/615; 423/616

(58) Field of Classification Search .......... 502/216, 502/350, 242, 258, 259; 428/403, 930; 252/301.6 S, 252/301.4 R, 304.6 R, 301.6 F, 301.6 R; 977/811–813; 423/610, 615, 616
See application file for complete search history.

(56) References Cited

U.S. PATENT DOCUMENTS 4,094,751 A    6/1978    Nozik .......... 204/80

(Continued)

FOREIGN PATENT DOCUMENTS

CN    1792445    *    6/2006

(Continued)

OTHER PUBLICATIONS

"Anoxic Hydrogen Production over CdS-based Composite Photocatalysts under Visible Light Irradiation (>=420 nm)", Jum Suk Jang et al. Studies in Surface Science and Catalysis, vol. 159 (2006), pp. 201-204.*

(Continued)

*Primary Examiner*—Patricia L Hailey (57) ABSTRACT

A composite photocatalyst includes a semiconducting core and a nanoscale particle disposed on a surface of the semiconducting core, wherein the nanoscale particle is an electron carrier, and wherein the photocatalyst is sensitive to visible light irradiation.

26 Claims, 11 Drawing Sheets

U.S. PATENT DOCUMENTS

| | | | | |
|---|---|---|---|---|
| 4,484,992 | A * | 11/1984 | Buhler et al. | 204/157.52 |
| 4,859,903 | A * | 8/1989 | Minematu et al. | 313/487 |
| 5,547,823 | A * | 8/1996 | Murasawa et al. | 430/531 |
| 5,985,173 | A * | 11/1999 | Gray et al. | 252/301.4 R |
| 6,037,289 | A * | 3/2000 | Chopin et al. | 502/2 |
| 6,108,476 | A * | 8/2000 | Iimura | 385/128 |
| 6,113,861 | A * | 9/2000 | Ogata | 422/122 |
| 6,248,218 | B1 | 6/2001 | Linkous et al. | 204/157.49 |
| 6,447,650 | B1 | 9/2002 | Park et al. | 204/157.52 |
| 6,517,806 | B2 | 2/2003 | Park et al. | 423/657 |
| 6,572,829 | B2 | 6/2003 | Linkous et al. | 422/186.03 |
| 6,653,356 | B2 * | 11/2003 | Sherman | 516/90 |
| 6,815,064 | B2 * | 11/2004 | Treadway et al. | 428/403 |
| 6,828,720 | B2 * | 12/2004 | Cavallaro et al. | 313/489 |
| 6,833,089 | B1 * | 12/2004 | Kawahara et al. | 252/520.2 |
| 6,911,082 | B2 * | 6/2005 | Sato et al. | 117/68 |
| 6,938,546 | B2 * | 9/2005 | Suda et al. | 101/467 |
| 7,309,664 | B1 * | 12/2007 | Marzolin et al. | 442/97 |
| 7,326,654 | B2 * | 2/2008 | Sato et al. | 438/745 |
| 7,381,465 | B2 * | 6/2008 | Torimoto et al. | 428/403 |

FOREIGN PATENT DOCUMENTS

| | | | |
|---|---|---|---|
| JP | 06-182218 | * | 7/1994 |
| KR | 10-2003-0042569 | * | 6/2003 |
| WO | 2009/050639 | * | 4/2009 |

OTHER PUBLICATIONS

"Fabrication of CdS/TiO2 nano-bulk composite photocatalysts for hydrogen production from aqueous H2S solution under visible light," Jum Suk Jang et al. Chemical Physics Letters 425 (2006), pp. 278-282.*

Buhler et al.;"Photochemical Hydrogen Production with Cadmium Sulfide Suspensions", J. Phys. Chem., 88 (1984) 3261-3268.

Tambwekar et al.; "Photocatalytic Generation of Hydrogen from Hydrogen Sulfide: An Energy Bargain"; Int. J. Hydrogen Energy, vol. 22, No. 10/11, (1997); pp. 959-965.

Naman et al.; "Photocatalytic Production of Hydrogen from Hydrogen Sulfide in Ethanolamine Aqueous Solution Containing Semiconductors Dispersion"; J. Hydrogen Energy, vol. 20, No. 4, (1995); pp. 303-307.

Matsumura et al.; "Photocatalytic Hydrogen Production from Solutions of Sulfite Using Platinized Cadmium Sulfide Powder"; J. Phys. Chem., 87 (1983); pp. 3807-3808.

Naman et al.; "Hydrogen Production from the Splitting of $H_2S$ by Visible Light Irradiation of Vanadium Sulfides Dispersion Loaded with $RuO_2$"; Int. J. Hydrogen Energy, vol. 11, No. 1 (1986); pp. 33-38.

Meissner et al.; "Fundamental Problems of Water Splitting at Cadmium Sulfide", Chem. Phys. Lett., 127(5) (1986) 419-423.

Meissner et al.; "Photocorrosion of Cadmium Sulfide: Analysis By Photoelectron Spectroscopy"; Applied Surface Science 27 (1987); pp. 423-436.

Frank et al.;"Visible-Light-Induced Water Cleavage and Stabilization of n-Type CdS to Photocorrosion with Surface Attached Polypyrrole Catalyst Coating", J. Phys. Chem., 86 (1982) 1933-1935.

Meissner et al.; "Photoelectrochemistry of Cadmium Sulfide. 1. Reanalaysis of Photocorrosion and Flat-Band Potential", J. Phys. Chem., 92 (1988) 3476-3483.

Spanhel et al.; "Photochemistry of Semiconductor Colloids. 22. Electron Injection from Illuminated CdS into Attached $TiO_2$ and ZnO Particles"; Am. Chem. Soc., 109 (1987); pp. 6632-6635.

Shangguan et al.; "Photocatalytic Hydrogen Evolution from Water on Nanocomposites Incorporating Cadmium Sulfide into the Interlayer"; J. Phys. Chem., 106 (2002); pp. 12227-12230.

Kida et al.; "$LaMnO_3$/ CdS nanocomposite: a new photocatalyst for hydrogen production from water under visible light irradiation"; Chemical Physics Letters 371 (2003); pp. 563-567.

* cited by examiner

PHOTOCATALYST AND USE THEREOF

CROSS REFERENCE TO RELATED APPLICATIONS

The present application claims the benefit of U.S. Provisional Patent Application No. 60/689,678, which was filed on Jun. 10, 2005, and is incorporated herein in its entirety.

BACKGROUND

The present disclosure generally relates to photocatalysts and, more particularly, to semiconducting photocatalysts having visible light activity.

Photocatalysts have garnered significant attention not only for their potential use in the production of hydrogen and/or oxygen from water, but also in the treatment of waste materials and purification of air. Photocatalysts are frequently formed from semiconductors or from organometallic complexes, such as chlorophyll. Of the two, semiconductors are generally preferred owing in part to their chemical stability, low cost of production, broad energy bandgaps, and the ease with which they can be handled.

Semiconductor photocatalysis is initiated by the direct absorption of a photon, which creates separated electrons and holes across the energy bandgap. The strongly reducing electrons and the strongly oxidizing holes, generated by the optical excitation, must move to the surface of the semiconductor in order to be used in the particular catalytic cycle.

Photocatalytic processes that make use of solar energy are highly desirable. The intensity of sunlight is strongest at a wavelength of about 500 nanometers (nm), and the overall visible light region accounts for about 43% of solar energy. Thus, to effectively utilize solar energy, it would be advantageous for the photocatalyst to be sensitive to visible light. Unfortunately, early semiconductor photocatalysts exhibited limited or zero visible light activity and instead were sensitive to ultraviolet (UV) light, which only accounts for about 5% of sunlight.

Although more recently developed photocatalysts have improved visible light activity, they suffer from poor efficiency and/or stability, such as when they undergo photocorrosion (i.e., when holes in the valence band react with the photocatalyst itself, resulting in decomposition). There accordingly remains a need in the art for new and improved photocatalysts.

BRIEF SUMMARY

A composite photocatalyst includes a semiconducting core and a nanoscale particle disposed on a surface of the semiconducting core, wherein the nanoscale particle is an electron carrier, and wherein the photocatalyst is sensitive to visible light irradiation.

In another embodiment, the composite photocatalyst includes a CdS core having an average smallest dimension of about 250 nanometers and a nanoscale particle of $TiO_2$ disposed on a surface of the CdS core, wherein the composite photocatalyst is sensitive to visible light irradiation.

A method of using a composite catalyst includes irradiating a gas or liquid medium comprising the composite photocatalyst with light, wherein the composite photocatalyst comprises a semiconducting core and a nanoscale particle disposed on a surface of the semiconducting core, wherein the nanoscale particle is an electron carrier having a different composition than the semiconducting core.

The above described and other features are exemplified by the following figures and detailed description.

BRIEF DESCRIPTION OF THE DRAWINGS

Referring now to the figures, which are exemplary embodiments and wherein like elements are numbered alike:

FIG. 4 (a)-(c) illustrates transmission electron microscope images, each at different magnification levels, and (d) an energy dispersive X-ray spectrum for the CdS—$TiO_2$ composite photocatalyst;

DETAILED DESCRIPTION

Figure 1:
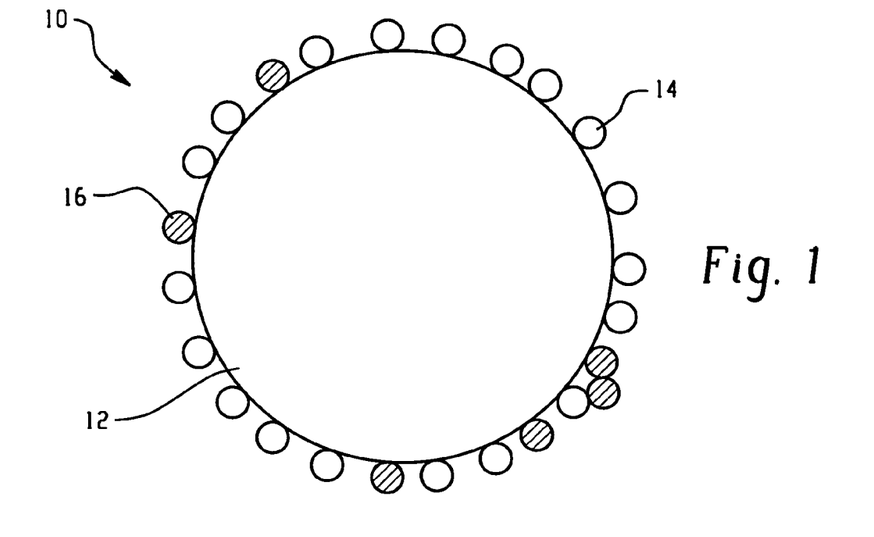
FIG. 1 is a schematic representation of a composite photocatalyst.

Disclosed herein are composite photocatalysts and methods for their use. In one embodiment, as shown in FIG. 1, a composite photocatalyst 10 comprises a semiconducting core 12 and a nanoscale particle 14 that is disposed on a surface of the semiconducting core 12, wherein the nanoscale particle 14 is an electron carrier. As used herein, the term "nanoscale" generally refers to those materials having an average longest grain dimension of less than or equal to about 100 nanometers (nm).

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges reciting the same quantity or physical property are inclusive of the recited endpoints and independently combinable. The modifier "about" used in connection with a quantity is inclusive of the stated value and has the meaning dictated by the context or includes at least the degree of error associated with measurement of the particular quantity.

The semiconducting core 12 may be any well crystallized semiconducting composition provided that the bandgap energy of the material is less than or equal to about 3.1 electron Volts (eV), which allows for the absorption of wavelengths greater than or equal to about 400 nm. Bandgap energies greater than about 3.1 eV would preclude sensitivity to visible light. An exemplary composition for the semiconducting core 12 is CdS, because of its bandgap energy of 2.4 eV. Other suitable semiconducting core 12 compositions include Si, Ge, GaP, GaAs, GaSb, InSb, InP, CdTe, InN, metal oxides including binary and/or mixed metal oxides (e.g., delafossite-like and perovskite-type oxides), and the like.

In one embodiment, the semiconducting core 12 has an average smallest dimension of about 250 nm. In another embodiment, the semiconducting core 12 has an average smallest dimension of about 500 nm. In yet another embodiment, the semiconducting core 12 has an average smallest dimension of about 1 micrometer (μm).

The nanoscale particle 14 may be any electron carrying composition, provided that it is a different composition than that of the semiconducting core 12; that it does not react with the semiconducting core 12, the medium in which the photocatalysis occurs, or the reactants; and that it is stable under the conditions of the reaction. An exemplary type of nanoscale particle 14 compositions include metal oxides such as $TiO_2$, NiO, $Na_2TiO_3$, ZnO, $LaMnO_3$, $CuFeO_2$, and the like. Furthermore, if more than one nanoscale particle 14 is disposed on the surface of the semiconducting core 12, the more than one nanoscale particles 14 may or may not have the same composition.

In one embodiment, the nanoscale particle 14 has an average longest grain dimension of less than or equal to about 50 nm. In another embodiment, the nanoscale particle 14 has an average longest grain dimension of less than or equal to about 25 nm. In yet another embodiment, the nanoscale particle 14 has an average longest grain dimension of less than or equal to about 10 nm.

The relative amounts of the nanoscale particle 14 and the semiconducting core 12 can be tailored to the particular application for the composite photocatalyst 10. In one embodiment, the mole fraction of the nanoscale particle 14 is greater than or equal to about 0.10, based on the total moles of the nanoscale particle 14 and the semiconducting core 12. In another embodiment, the molar fraction of the nanoscale particle 14 is greater than or equal to about 0.25. In yet another embodiment, the molar fraction of the nanoscale particle 14 is greater than or equal to about 0.50. Alternatively, the molar fraction of the nanoscale particle 14 is less than or equal to about 0.90. In another embodiment, the molar fraction of the nanoscale particle 14 is less than or equal to about 0.80. In yet another embodiment, the molar fraction of the nanoscale particle 14 is less than or equal to about 0.67.

Optionally, the composite photocatalyst 10 may further comprise a co-catalyst 16 disposed on a surface of the semiconducting core 12 and/or nanoscale particle 14. The choice of the co-catalyst 16 will depend on the particular application, the semiconducting core 12, and the nanoscale particle 14; and can readily be determined by one of ordinary skill in the art in view of this disclosure. If a co-catalyst 16 is used, however, it may not have the same composition as the semiconducting core 12 and the nanoscale particle 14. Examples of the co-catalyst 16 include a transition metal such as Ni, Pt, Rh, or Ag, and metal oxides such as $IrO_2$, $NiO_x$ or $RuO_2$. The co-catalyst 16 may be deposited on the surface of the semiconducting core 12 and/or nanoscale particle 14 by any suitable method such as impregnation or photodeposition. The amount of the co-catalyst 16 is generally about 0.01 to about 10 weight percent (wt %), based on the total weight of the overall composite photocatalyst 10.

The compositions used to form the semiconducting core 12, nanoscale particle 14, and/or the optional co-catalyst 16 described above are either commercially available or can be synthesized using routine chemistry. For example, the nanoscale particle 14 may be formed by a variety of techniques including sol-gel processing, gas phase synthesis (e.g., inert gas condensation, combustion flame synthesis, laser ablation, chemical vapor condensation, electrospray, plasma spray, or the like), sonochemical processing, hydrodynamic cavitation, microemulsion processing, high-energy mechanical attrition (e.g., room temperature ball milling, cryomilling, or the like), or like technique. These techniques are well known, and the choice of technique to produce a specific composition will be recognizable to those skilled in the art in view of this disclosure without undue experimentation.

In addition, the composite photocatalyst 10, or the individual components thereof, can be subjected to any of a variety of known post-synthetic processes. For example, the semiconducting core 12 and/or the nanoscale particle 14 can undergo a thermal treatment (e.g., calcination, sintering, or the like). This heat treatment can be used to improve crystallinity, increase grain size, and/or heal surface defects in the crystallites, which may be responsible for energy-wasteful photoelectron-hole recombination. In another example, the optional co-catalyst 16 can be activated after being deposited on a surface of the semiconducting core 12 and/or nanoscale particle 14.

The composite photocatalysts disclosed herein may be used in a variety of applications, such as during the production of hydrogen from water, removal of malodorous gases in air, decomposition of harmful substances contained in water or air, decomposition of harmful substances deposited on solid surfaces, and in photochemical reactions.

In a method for the production of hydrogen from water, the water is irradiated with light in the presence of the composite photocatalyst 10. The water may be substantially pure or may contain a salt, such as carbonate, bicarbonate, iodide or bromide, as in the case of the electrolysis of water. Alternatively, the water may contain a reducing agent acting as a hole scavenger, such as sulfite, sulfide, an alcohol, a carbohydrate, a solid carbon, and the like. The composite photocatalyst 10 may be used in any desired form. For example, it may be suspended or dispersed in the water or disposed on a suitable support within the water. The amount of the composite photocatalyst 10 may be determined so that incident light may be efficiently absorbed. Generally, the composite photocatalyst 10 is used in an amount of about 0.05 to about 10 grams (g)

per 25 square centimeters (cm²) of an irradiation area. When a reducing agent is added to the water, the irradiation of the water with light, in the presence of the composite photocatalyst 10, results only in the anoxic production of hydrogen.

In a method of decomposing harmful substances including a malodorous or harmful gas contained in a gas or liquid medium, the gas or liquid medium is irradiated with light in the presence of the composite photocatalyst 10, so that the malodorous or harmful gas is decomposed into harmless materials. In the photocatalytic reaction, the harmful substance acts as an electron donor and is oxidized and decomposed by the holes generated by the irradiation of the composite photocatalyst 10 with light. The electrons generated by the irradiation cause the formation of hydrogen or the reduction of oxygen, depending upon the reaction environment. In the case of decomposition of malodorous or harmful gases, the reaction is suitably performed in a gas phase, in which the composite photocatalyst 10 is disposed on a support. In the case of decomposition of harmful substances contained in a liquid, the liquid is irradiated with light in the presence of the composite photocatalyst 10. The composite photocatalyst 10 may be used in any desired form. For example, the photocatalyst may be suspended or dispersed in the liquid or disposed on a suitable support placed in the liquid.

The harmful substances to be decomposed may include, for example, $NO_x$, $SO_x$, fluorocarbons, ammonia gas, hydrogen sulfide, alcohols, aldehydes, amines, mercaptans, aromatic hydrocarbons (e.g., benzene, toluene, and xylene), phenolic compounds, agricultural chemicals (e.g., herbicides, bactericides, and pesticides), cyan compounds, sulfur compounds, germs (e.g., coliform bacteria and staphylococcus), fungi, algae, oils, nicotine tars, or the like, or a combination comprising at least one of the foregoing substances.

The light used for these photocatalytic reactions can have wavelengths ranging from ultraviolet to visible. In an exemplary embodiment, visible light with a wavelength greater than about 400 nm is used. The reaction systems may also be irradiated with light of a selected wavelength. The light sources may be, for example, sunlight, a fluorescent lamp, a black light, a mercury lamp and/or a xenon lamp.

This disclosure is further illustrated by the following non-limiting examples.

EXAMPLE 1

Synthesis of CdS—TiO₂ Composite Photocatalyst

A stoichiometric amount of an aqueous solution of Na₂S was added dropwise to a solution of Cd(NO₃)₂ dissolved in isopropyl alcohol. The dried, filtered CdS precipitate was calcined at about 1073 degrees Kelvin (K), or 800 degrees Celsius (° C.), for about 1 hour under He to improve its crystallinity. The crystalline CdS was stirred in isopropyl alcohol and tetra-titanium isopropoxide in water was added dropwise such that the molar ratio of Ti to CdS was 4 to 1. The dried, filtered composite powder was calcined at about 673 K for between about 1 to about 3 hours in air to improve the crystallinity of the TiO₂ phase.

Figure 2:
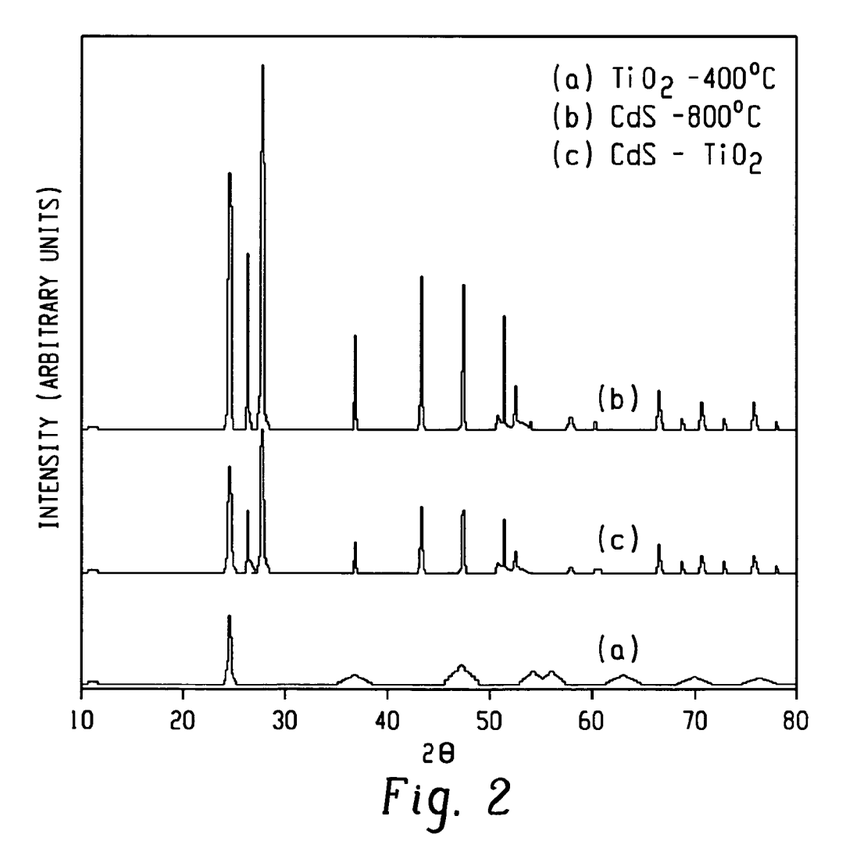
FIG. 2 illustrates powder X-ray diffraction patterns for (a) $TiO_2$ calcined at 400 degrees Celsius (° C.) in air, (b) CdS calcined at 800° C. for 1 hour under He, and (c) a CdS—$TiO_2$ composite photocatalyst.

The products were first characterized by powder X-ray diffraction (PXRD). FIG. 2 shows representative PXRD patterns, taken with a Mac Science Company (M18XHF) X-ray diffractometer (Cu K$_\alpha$ radiation), of (a) TiO₂ calcined at 400° C. in air, (b) CdS calcined at 800° C. for 1 hour under He, and (c) the CdS—TiO₂ composite photocatalyst. When comparing the PXRD patterns within FIG. 2, it was evident that the composite photocatalyst sample had two phases, corresponding to a well crystallized hexagonal CdS phase and a nanocrystalline anatase phase.

Figure 3:
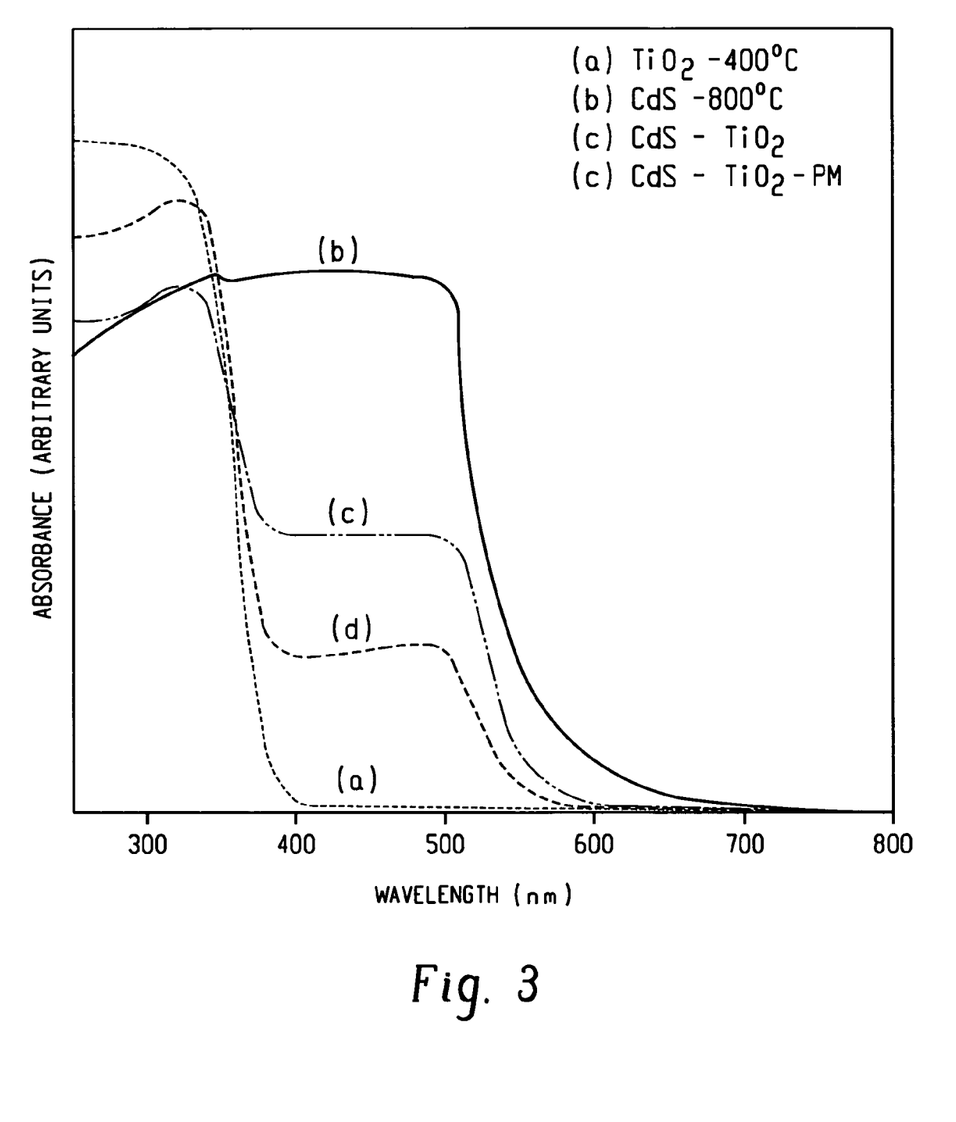
FIG. 3 illustrates diffuse reflectance UV-Visible spectra for (a) $TiO_2$ calcined at 400° C. in air, (b) CdS calcined at 800° C. for 1 hour under He, (c) the CdS—$TiO_2$ composite photocatalyst, and (d) a physical mixture of CdS and $TiO_2$.

FIG. 3 illustrates representative UV-visible diffuse reflectance spectra, obtained with a Shimadzu UV 2401 spectrophotometer, of (a) TiO₂ calcined at 400° C. in air, (b) CdS calcined at 800° C. for 1 hour under He, (c) the CdS—TiO₂ composite photocatalyst, and (d) a physical mixture of CdS and TiO₂. These spectra further confirm that the composite photocatalyst includes two separate phases of CdS and TiO₂ similar to a physical mixture of the two compounds.

Figure 4A:
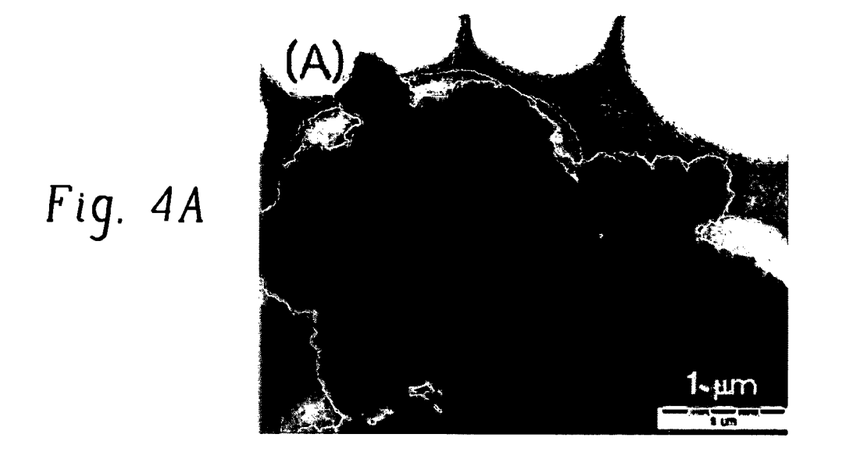
Figure 4B:
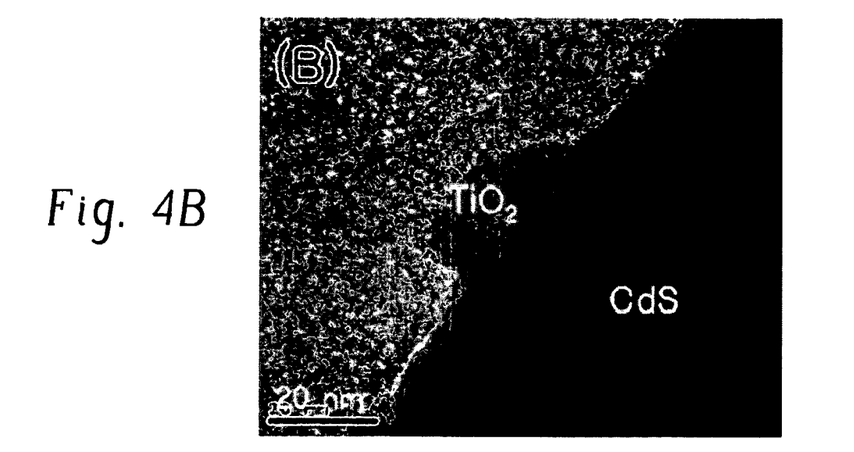
Figure 4C:
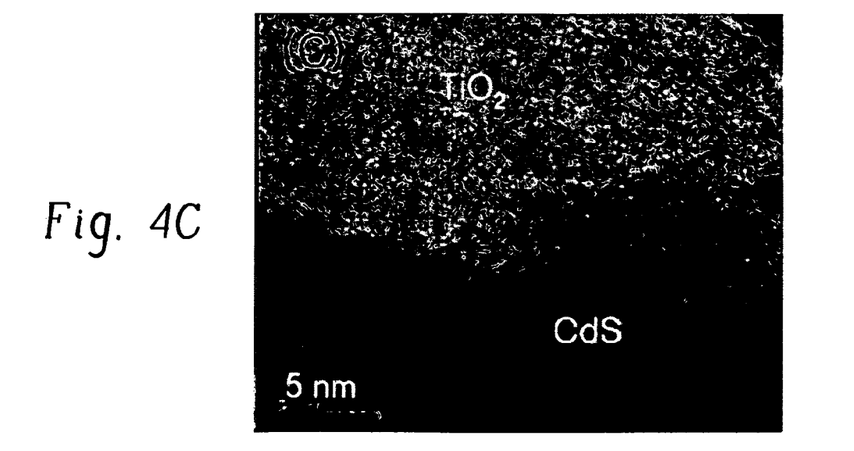
Figure 4D:
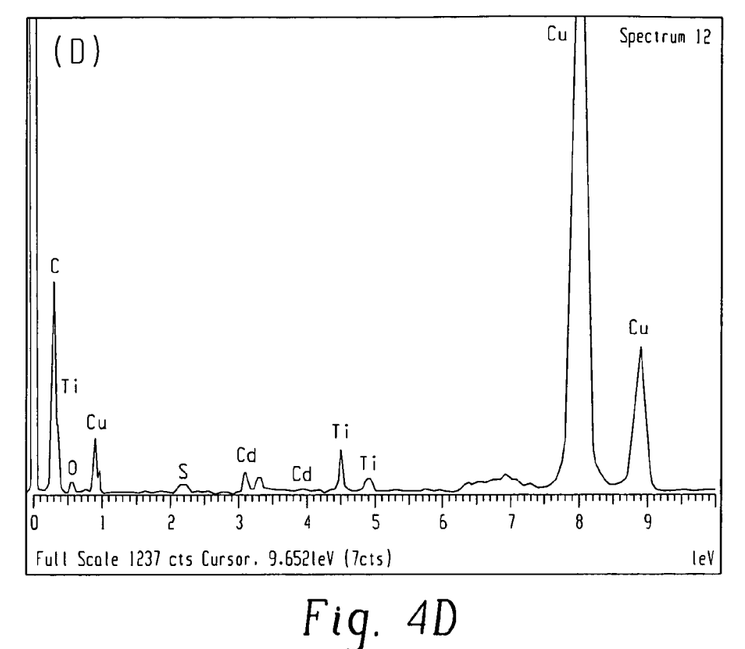

The particle morphologies of composite photocatalyst samples were investigated using a JEOL JEM 2010F transmission electron microscope (TEM), equipped with a field emission gun. FIG. 4 (a)-(c) depicts three different TEM images, each at different magnification levels, of the composite photocatalyst disposed on a lacey carbon sample holder. As indicated in the electron micrographs, the composite photocatalyst particles were irregularly shaped, with TiO₂ nanoparticles of about 10 to about 20 nanometers (nm) generally disposed on the surface of a CdS core, which was about 1 to about 2 μm. FIG. 4 (d) illustrates a representative energy dispersive X-ray spectrum, which verifies that the composite photocatalyst contains only Cd, S, Ti, and O as constituents.

EXAMPLE 2

Hydrogen Production Using CdS—TiO₂ Composite Photocatalyst

About 1 weight percent (wt %) of Pt was deposited onto the composite photocatalyst using a photodeposition technique under visible light. The photocatalytic reactions were carried out at ambient temperature and pressure in a closed circulation system using a 500 Watt (W) Hg-arc lamp equipped with a longpass or UV cutoff filter to remove light having a wavelength (λ) below 420 nm. The reactions were performed with about 0.1 grams (g) of photocatalyst in about 100 milliliters (mL) of an aqueous solution containing about 0.1 mole/liter (M) Na₂S and about 0.02M Na₂SO₃. The amount of H₂ produced was determined using gas chromatography with argon as the carrier gas, a 5 Angstrom (Å) molecular sieve column, and a thermal conductivity detector. Hydrogen levels of about 485 micromoles/hour (μmol/h) were achieved.

EXAMPLE 3

Comparison of Photocatalyst Performance

In this example, the CdS—TiO₂ composite photocatalyst was compared to a series of single phase CdS photocatalysts. The average hydrogen evolution rates during a 5-hour period, as well as other physical properties, for each of the photocatalysts are shown in Table 1. It is clear that with respect to the three CdS samples, as the crystallinity of the CdS increased (i.e., calcination temperature increased), the rate of hydrogen production increased.

TABLE 1

| | Photocatalyst properties. | | | |
|---|---|---|---|---|
| | Surface area | Bandgap Energy | | H₂ evolution rate |
| Photocatalyst | [m²/g] | $E_g$(eV) | $\lambda_{ab}$(nm) | [μmol/h] |
| CdS (Aldrich) | 9.6 | 2.25 | 550 | 9 |
| CdS-400° C. | 28.8 | 2.18 | 570 | 6.9 |

TABLE 1-continued

Photocatalyst properties.

| Photocatalyst | Surface area [m²/g] | Bandgap Energy | | H₂ evolution rate [μmol/h] |
|---|---|---|---|---|
| | | $E_g$(eV) | $\lambda_{ab}$(nm) | |
| CdS-800° C. | <1 | 2.18 | 570 | 96.4 |
| CdS—TiO₂ composite | 97.0 | 2.25 | 550 | 422.4 |

Figure 5:
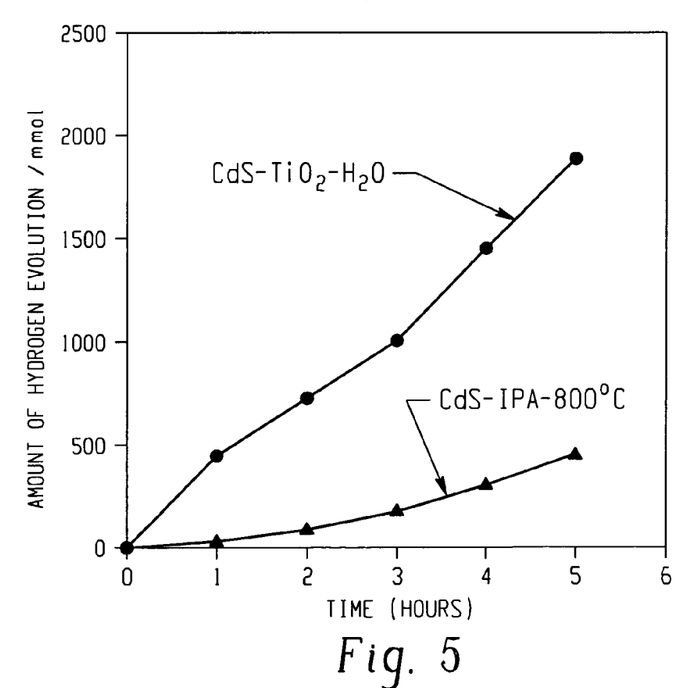
FIG. 5 is a graphical representation of the hydrogen production for the CdS—$TiO_2$ composite photocatalyst and a single-phase CdS photocatalyst over time.

FIG. 5 graphically illustrates the results of the photocatalytic reaction, as described in Example 2, for a sample of the CdS—TiO₂ composite photocatalyst and a sample of 800° C.-calcined CdS, with the exception that isopropyl alcohol was used as the solvent for the 800° C.-calcined CdS sample. The CdS—TiO₂ composite photocatalyst exhibited a significantly greater photocatalytic activity than the CdS photocatalyst having similar crystallinity. After about 5 hours, the CdS—TiO₂ composite photocatalyst was able to generate about four times more hydrogen than the CdS photocatalyst. In contrast to the CdS—TiO₂ composite photocatalyst, the CdS photocatalyst was plagued by an induction period of about 1 to about 2 hours before a steady state hydrogen evolution rate could be established.

EXAMPLE 4

Comparison of CdS Semiconducting Core Calcination Temperature

In this example, the effects of the temperature of the post-synthetic heat treatment, to which the CdS semiconducting core was subjected, were studied. CdS was made according to the procedure described in EXAMPLE 1. Individual samples were calcined for one hour in a He environment at various temperatures ranging from about 673 K to about 1073 K.

Figure 6:
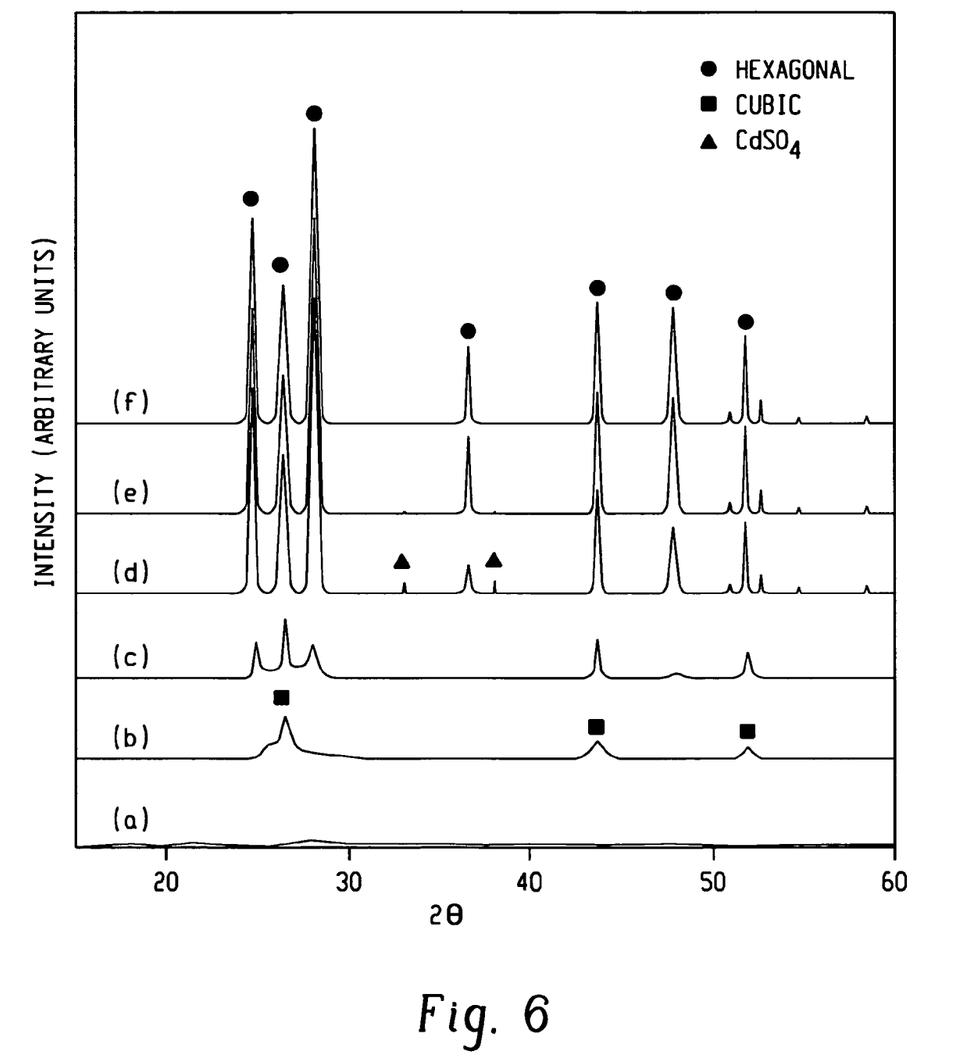
FIG. 6 illustrates powder X-ray diffraction patterns for (a) an as-synthesized sample of CdS and for CdS samples calcined at (b) 673 degrees Kelvin (K), (c) 773 K, (d) 873 K, (e) 973 K, and (f) 1073 K.

FIG. 6 illustrates representative PXRD patterns for (a) an unheated sample and for samples calcined at (b) 673 K, (c) 773 K, (d) 873 K, (e) 973 K, and (f) 1073 K. As shown in FIG. 6, the crystallinity of CdS increased with an increase in the calcination temperature. The PXRD patterns of FIG. 6 also show that the CdS in the samples calcined at or above about 873 K adopted the hexagonal wurtzite phase, while the CdS in those samples calcined below about 873 K adopted the cubic zinc-blende phase. It is also noted that the PXRD pattern of the sample calcined at about 873 K, shown in FIG. 6 (d), indicates the presence of a relatively small amount of CdSO₄.

Figure 7:
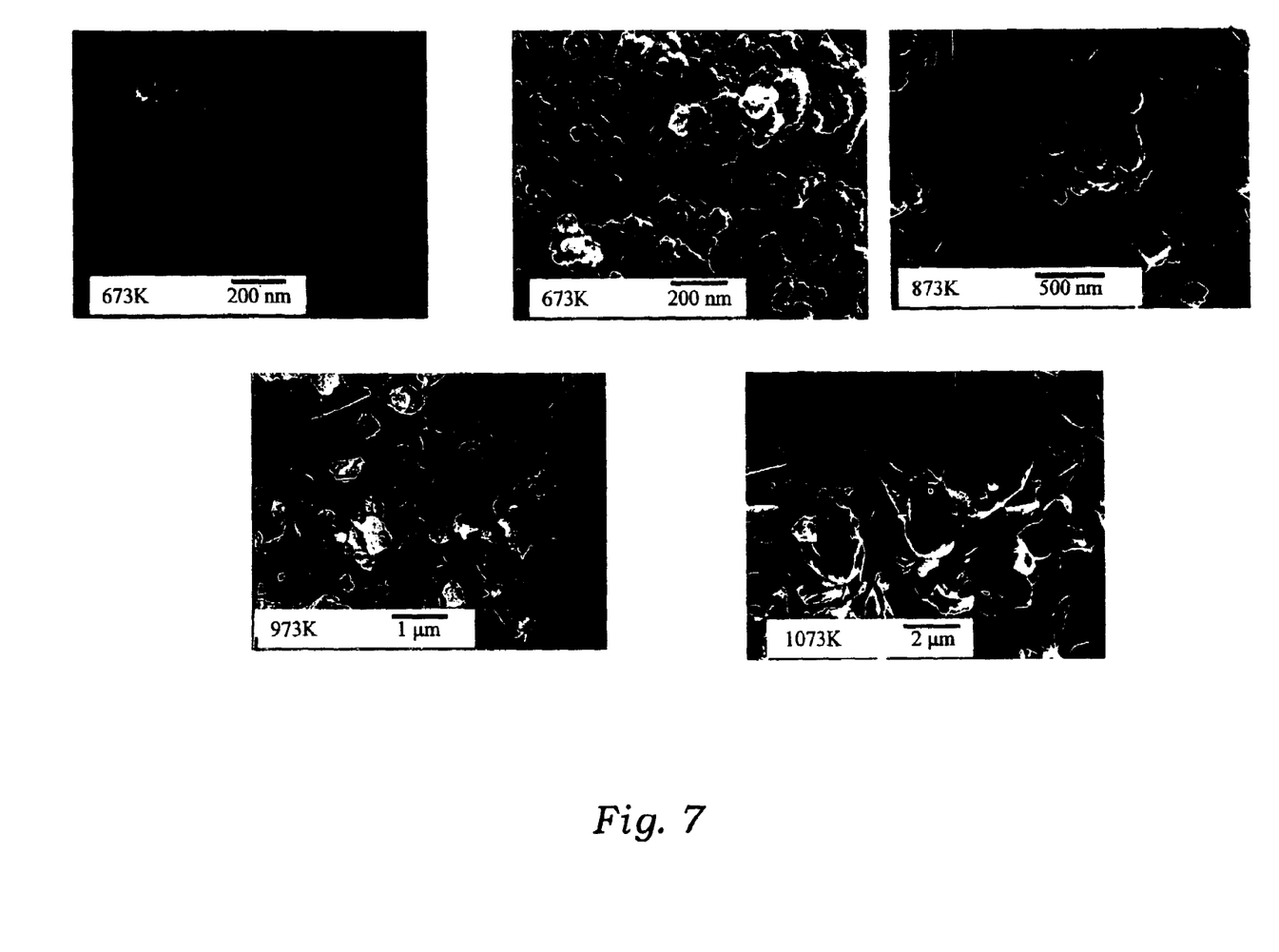
FIG. 7 illustrates scanning electron microscope images for the five CdS samples calcined shown in FIG. 6.

FIG. 7 illustrates representative scanning electron microscope (SEM) images for the CdS samples calcined at (a) 673 K, (b) 773 K, (c) 873 K, (d) 973 K, and (e) 1073 K. As shown in the electron micrographs, the morphology of the CdS samples changed from amorphous or nanoscale particles to irregular bulk particles having average dimensions of about 1 to about 2 μm.

UV-visible diffuse reflectance spectra were obtained for each of the six samples shown in FIG. 6. While the shape and position of the absorption edges for each calcined sample were not significantly different, each sample exhibited a distinct absorption intensity. Specifically, as the calcination temperature increased, the absorption intensity decreased. Furthermore, the calcined samples exhibited sharper absorption edges than the as-synthesized, uncalcined sample, which was expected owing to the improved crystallinity associated with the heat treatment.

Figure 8:
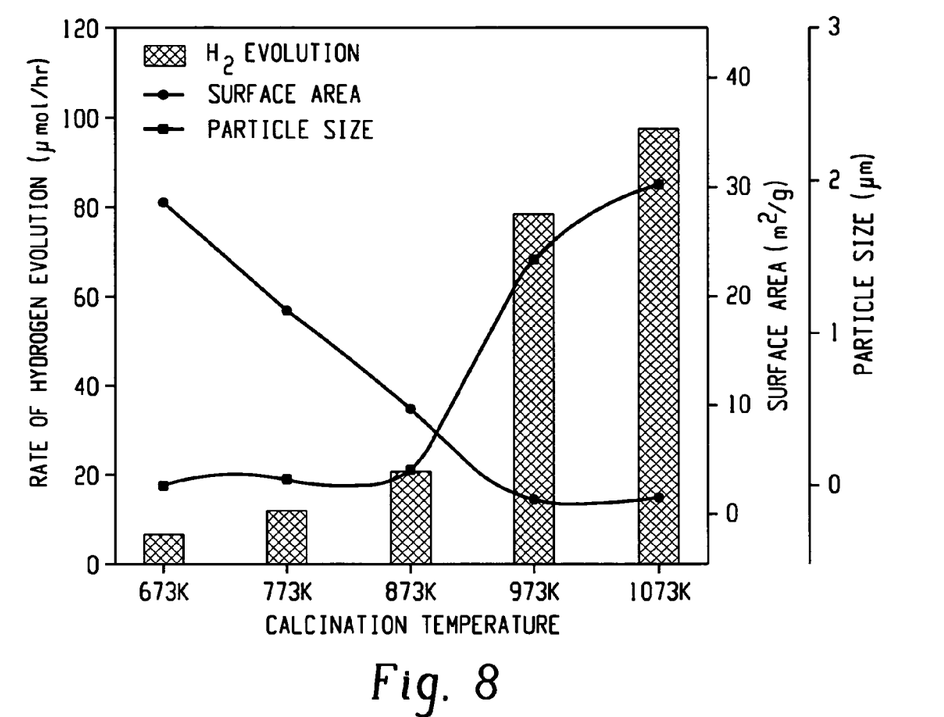
FIG. 8 is a graphical representation of hydrogen evolution rates, BET surface areas, and particle sizes for the five calcined samples of CdS shown in FIGS. 6 and 7.

Finally, the photocatalytic properties of each of the calcined samples were tested. Shown in FIG. 8 are graphs for evolution rates of H₂, BET surface areas, and particle sizes for each sample. As indicated in the Figure, the rate of hydrogen evolution increased with CdS particle size and decreased with surface area, for which the increased calcination temperature was responsible. As mentioned above, the CdS photocatalysts were plagued by an induction period of about 1 to about 2 hours before a steady state hydrogen evolution rate could be established.

EXAMPLE 5

Comparison of CdS to TiO₂ Concentration in CdS—TiO₂ Composite Photocatalyst

In this example, the effects of varying the ratio of CdS to TiO₂ were studied. The CdS—TiO₂ composite photocatalyst was made according to the procedure described in EXAMPLE 1. Five samples with mole fractions of TiO₂ ranging from 0 to 1 were prepared.

Figure 9:
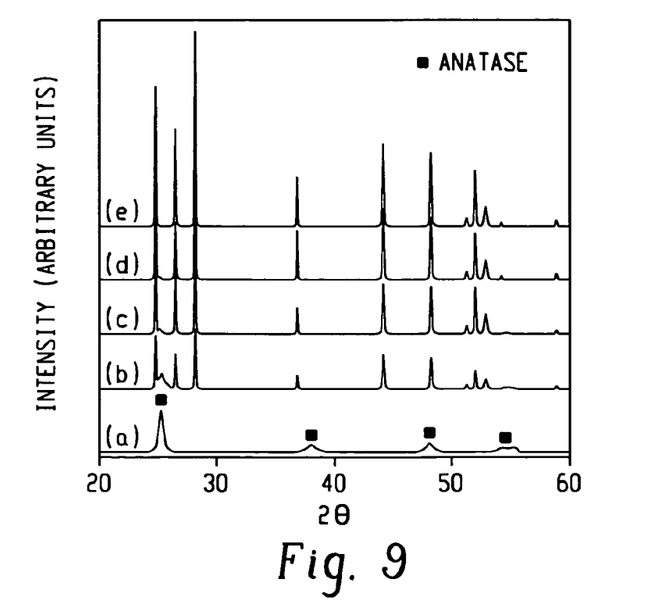
FIG. 9 illustrates powder X-ray diffraction patterns for a CdS—$TiO_2$ composite photocatalyst having a $TiO_2$ mole fraction of (a) 1.0 (b) 0.80, (c) 0.67, (d) 0.33, and (e) 0.0.

FIG. 9 illustrates representative PXRD patterns for samples having a TiO₂ mole fraction of (a) 1.0 or pure TiO₂, (b) 0.8, (c) 0.67, (d) 0.33, and (e) 0.0 or pure CdS. As shown in FIG. 9, CdS was in the form of the hexagonal wurtzite phase and the TiO₂ was present in the form of anatase.

Figure 10:
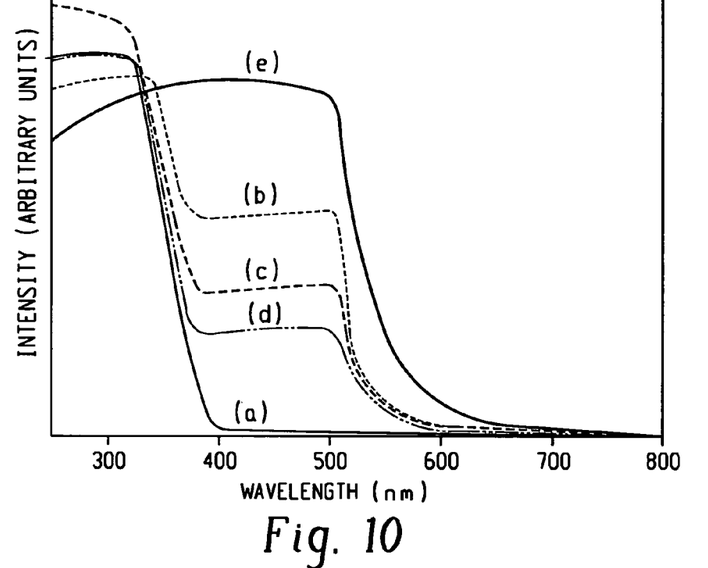
FIG. 10 illustrates diffuse reflectance UV-Visible spectra for the five samples shown in FIG. 9.

UV-visible diffuse reflectance spectra were obtained for each of the samples shown in FIG. 9. The spectra are shown in FIG. 10. The pure CdS sample exhibited a sharp absorption edge at 570 nm, while the pure TiO₂ sample exhibited a sharp edge at 390 nm. The spectra of the three composite photocatalysts exhibited a combination of these two spectra, although the presence of the TiO₂ in the composite photocatalyst resulted in a blue-shift of the main absorption edge to 550 nm.

Figure 11:
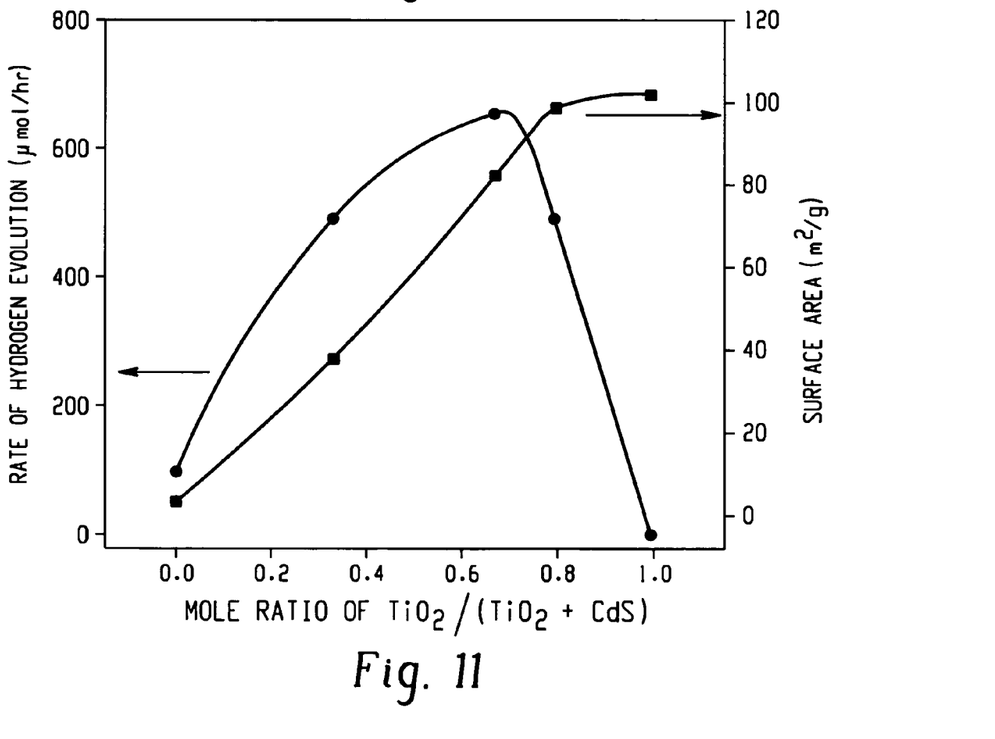
FIG. 11 is a graphical representation of hydrogen evolution rates and BET surface areas for the five samples shown in FIGS. 9 and 10.

The photocatalytic properties of each of the samples were tested. Shown in FIG. 11 are graphs for evolution rates of H₂ and BET surface areas for each sample. From the graphs, the optimum mole fraction of TiO₂ in the composite photocatalyst for H₂ evolution from an aqueous solution containing 0.1 M Na₂S and 0.02 M Na₂SO₃ as sacrificial reagents under visible light irradiation (□□ about 420 nm) appears to be about 0.67.

EXAMPLE 6

Comparison of TiO₂ Calcination Temperature

In this example, the effects of the temperature of the post-synthetic heat treatment, to which the TiO₂ particles were subjected after being deposited on the CdS semiconducting core, were studied. The TiO₂ was deposited onto the CdS according to the procedure described in EXAMPLE 1, using a TiO₂ mole fraction of 0.67. Individual samples were calcined for one hour in air at various temperatures ranging from about 573 K to about 773 K.

Figure 12:
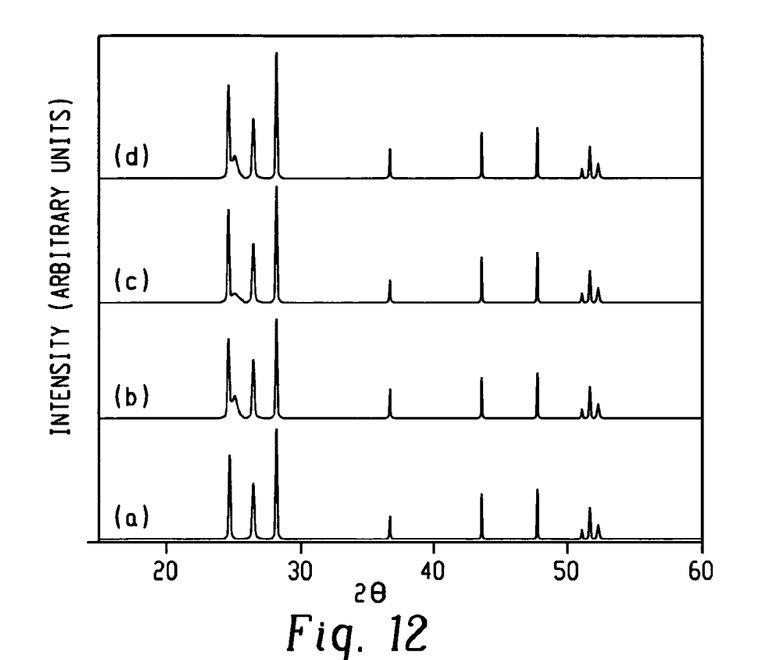
FIG. 12 illustrates powder X-ray diffraction patterns for (a) an as-synthesized sample of a CdS—$TiO_2$ composite photocatalyst and for samples of the composite photocatalyst calcined at (b) 573 K, (c) 673 K, and (d) 773 K.

FIG. 12 illustrates representative PXRD patterns for (a) an unheated sample and for samples calcined at (b) 573 K, (c) 673 K, and (d) 773 K. As shown in FIG. 12, there was no observable presence of anatase until the calcination temperature was at or above about 673 K. In addition, the crystallinity of the anatase increased with an increase in the calcination temperature. TEM images of each sample also indicate that the TiO₂ particles for the samples calcined at or above 673 K have an average dimension of about 20 nm, while the TiO₂ particles for the other two samples were amorphous.

Figure 13:
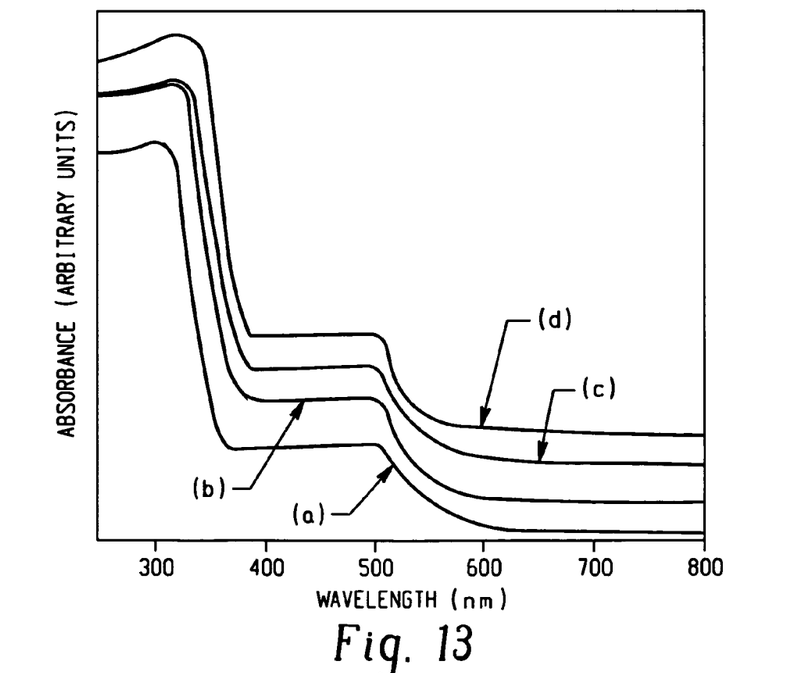
FIG. 13 illustrates diffuse reflectance UV-Visible spectra for the four samples shown in FIG. 12.

UV-visible diffuse reflectance spectra were obtained for each of the four samples shown in FIG. 12. The spectra, shown in FIG. 13, are similar for each sample, with the exception of the absorption intensity, which increases with calcination temperature.

Figure 14:
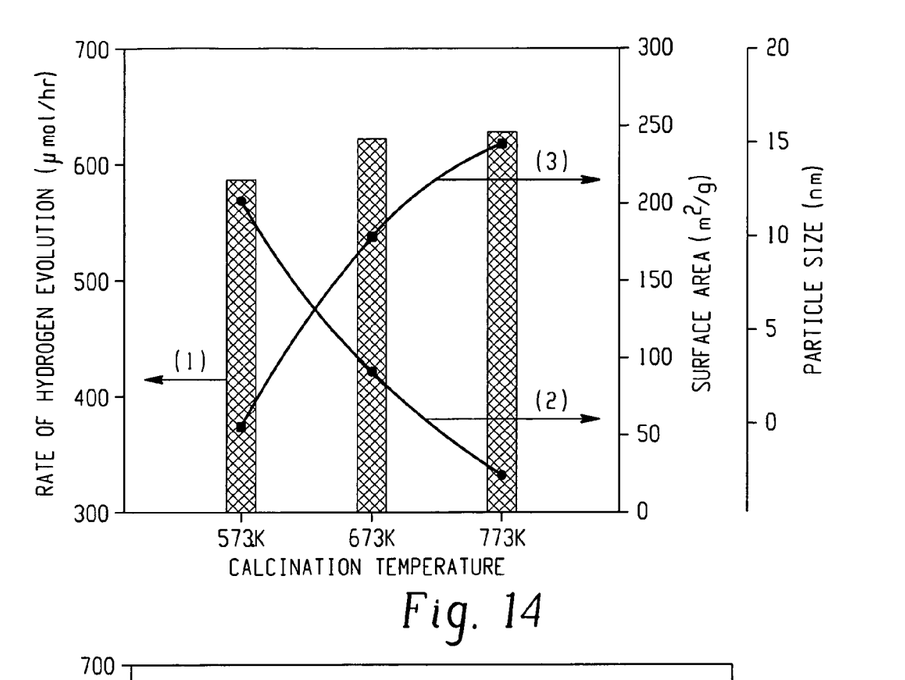
FIG. 14 is a graphical representation of hydrogen evolution rates, BET surface areas, and particle sizes for the three calcined samples shown in FIGS. 12 and 13.

The photocatalytic properties of each of the calcined samples were tested. Shown in FIG. 14 are graphs for [1] evolution rates of $H_2$, [2] BET surface areas, and [3] particle sizes for each sample. At increased calcination temperatures, the particle size of $TiO_2$ and the $H_2$ evolution rate increased, whereas the BET surface area decreased. It appeared that the calcination temperature for the $TiO_2$ particles had a lesser effect than the calcination temperature of CdS or the mole fraction of $TiO_2$ in the composite photocatalyst.

EXAMPLE 7

Fabrication of Composite Photocatalyst with Co-Catalyst

In this example, the effects of a co-catalyst on hydrogen production were studied. The $TiO_2$—CdS composite photocatalyst was prepared according to the procedure described in EXAMPLE 1, using a $TiO_2$ mole fraction of 0.67. 0.75 wt % of each co-catalyst was loaded onto the surface of the composite catalyst, and hydrogen evolution from an aqueous solution containing 0.1 M $Na_2S$ and 0.02 M $Na_2SO_3$ as sacrificial reagents under visible light irradiation was measured.

Figure 15:
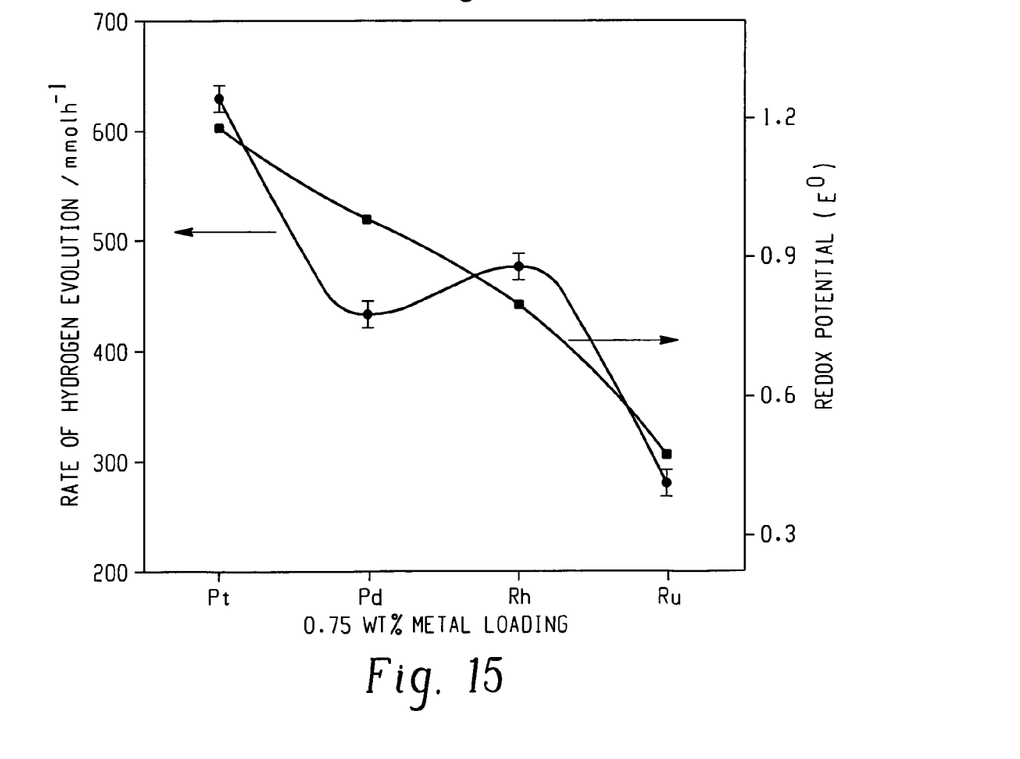
FIG. 15 is a graphical representation of the hydrogen production rates and the redox potentials for CdS—$TiO_2$ composite photocatalysts independently having Pt, Pd, Rh, and Ru metal co-catalysts disposed on a surface thereof.

FIG. 15 illustrates the rate of hydrogen production and the redox potential for Pt, Pd, Rh, and Ru metal co-catalysts. Hydrogen gas was evolved in the following sequence for the four metals: Pt (640 μmol/h for $H_2$)>Rh (459 μmol/h for $H_2$)>Pd (408 μmol/h for $H_2$)>Rh (261 μmol/h for $H_2$). From this data, it appeared that platinum was the optimal co-catalyst for this application.

EXAMPLE 8

Figure 16:
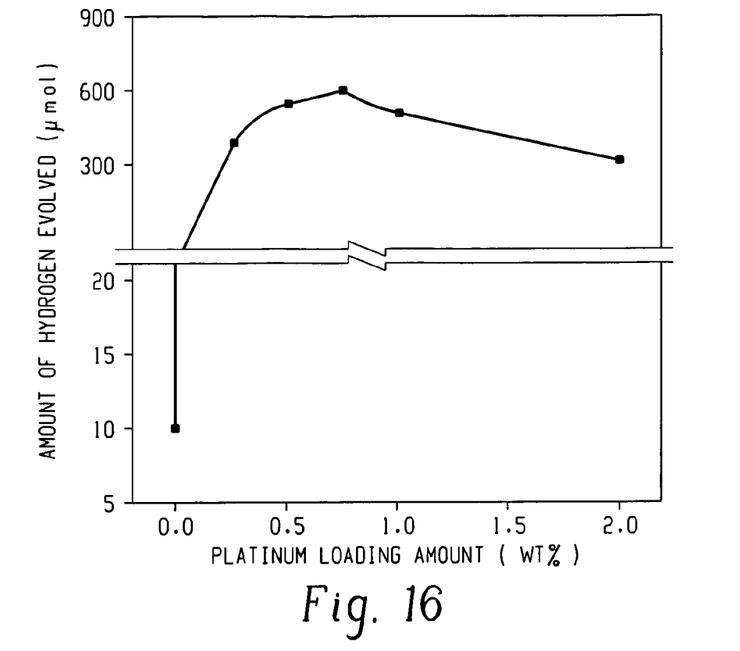
FIG. 16 is a graphical representation of the amount of hydrogen produced as a function of the concentration of a Pt co-catalyst disposed on a surface of a CdS—$TiO_2$ composite photocatalyst.

Comparison of Pt Co-Catalyst Concentration in CdS—$TiO_2$ Composite Photocatalyst In this example, the effects of varying the co-catalyst concentration on photocatalytic activity were studied. Five samples with Pt concentrations ranging from 0.25 to 2.0 were prepared. FIG. 16 illustrates the rate of hydrogen production for a composite photocatalyst having a Pt co-catalyst concentration of 0.0 wt % to 2.0 wt %. As shown in FIG. 16, the photocatalytic activity increased with the amount of Pt up to about 0.75 wt %, and then decreased gradually with increased amounts of Pt.

Figure 17:
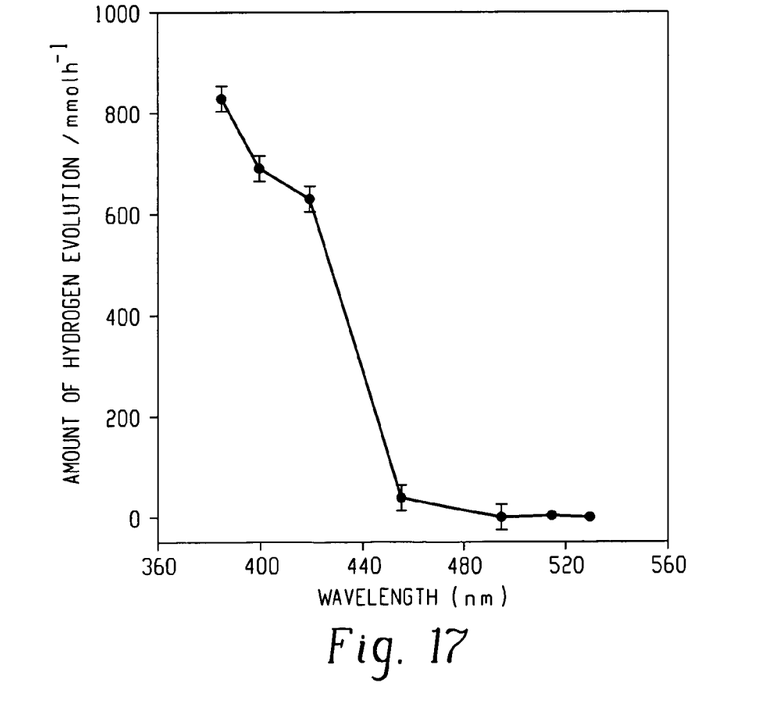
FIG. 17 is a graphical representation of the amount of hydrogen produced by a CdS—$TiO_2$—Pt composite photocatalyst as a function of the wavelength of irradiated light.

FIG. 17 shows an action spectrum for hydrogen evolution from an aqueous solution containing 0.1 M $Na_2S$ and 0.02 M $Na_2SO_3$ over the 0.75 wt % Pt loaded CdS—$TiO_2$ composite photocatalyst. The onset of the action spectrum does not exactly correspond to the absorption edge of the diffuse reflectance spectra for the composite catalyst. Hydrogen evolution was not observed in the wavelength region between about 495 and about 650 nm although it was within an absorption region of the CdS—$TiO_2$ composite photocatalyst, indicating that an overpotential may be useful to produce hydrogen.

It should be recognized by those skilled in the art in view of this disclosure that the composite photocatalysts described herein may overcome the deficiencies that plague existing photocatalysts. Specifically, the composite photocatalysts may have improved visible light sensitivity, improved efficiency, and increased stability. Furthermore, significant improvements in the level of anoxic hydrogen production under visible light irradiation can be achieved with the composite photocatalysts of the present disclosure.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A composite photocatalyst, comprising:
   a semiconducting core having a bandgap energy of less than or equal to 3.1 eV; and
   a nanoscale particle disposed on a surface of the semiconducting core, wherein the nanoscale particle is an electron carrier having a different composition than the semiconducting core;
   wherein absorption by the composite photocatalyst of visible light at a wavelength greater than about 400 nanometers generates photocatalytic activity sufficient to carry out a photocatalytic reaction.

2. The composite photocatalyst of claim 1, wherein the semiconducting core comprises CdS, Si, Ge, GaP, GaAs, GaSb, InSb, JnP, CdTe, InN, a delafossite metal oxide, or a perovskite metal oxide.

3. The composite photo catalyst of claim 1, wherein the semiconducting core has an average smallest dimension of about 250 nanometers.

4. The composite photocatalyst of claim 1, wherein the nanoscale particle comprises $TiO_2$, NiO, $Na_2TiO_3$, ZnO, $LaMnO_3$, $CuFeO_2$, or a combination comprising at least one of the foregoing.

5. The composite photocatalyst of claim 1, wherein the nanoscale particle has an average longest dimension of about 50 nanometers.

6. The composite photo catalyst of claim 1, wherein an amount of nanoscale particles are disposed on the surface of the semiconducting core at a mole fraction of, based on a total number of moles of the semiconducting core and the nanoscale particle, greater than or equal to about 0.10 and less than or equal to about 0.90.

7. The composite photocatalyst of claim 1, further comprising a co-catalyst for photocatalytic activity, having a different composition than the semiconducting core and the nanoscale particle, disposed on the surface of the semiconducting core, a surface of the nanoscale particle, or both.

8. The composite photocatalyst of claim 7, wherein the co-catalyst comprises Ni, Pt, Rh, Ag, Ru, Pd, $IrO_2$, an oxide of nickel, $RuO_2$, or a combination comprising at least one of the foregoing.

9. The composite photocatalyst of claim 7, wherein an amount of the co-catalyst in the composite photocatalyst is about 0.01 to about 10 weight percent, based on a total weight of the composite photocatalyst.

10. The composite photocatalyst of claim 7, wherein the co-catalyst comprises $IrO_2$, an oxide of nickel, $RuO_2$, or a combination comprising at least one of the foregoing.

11. The composite photocatalyst of claim 1, wherein the semiconducting core has an average smallest dimension of about 500 nanometers.

12. The composite photocatalyst of claim 1, wherein the semiconducting core has an average smallest dimension of about 1 micrometer.

13. The composite photocatalyst of claim 1, wherein the nanoscale particle comprises NiO, $Na_2TiO_3$, $LaMnO_3$, $CuFeO_2$, or a combination comprising at least one of the foregoing.

14. The composite photocatalyst of claim 1, wherein the semiconducting core comprises a delafossite metal oxide or a perovskite metal oxide.

15. A composite photocatalyst, comprising:
a CdS core that is calcined at a temperature of at least 673° K; and
nanoscale particles of $TiO_2$ disposed on a surface of the CdS core at a mole fraction, based on a total number of moles of the CdS core and the nanoscale $TiO_2$ particles, of between about 0.10 and about 0.90.

16. The composite photocatalyst of claim 15, further comprising a co-catalyst disposed on the surface of the CdS core, a surface of one or more of the nanoscale particles of $TiO_2$, or both.

17. The composite photo catalyst of claim 16, wherein the co-catalyst comprises Ni, Pt, Rh, Ag, Ru, Pd, $IrO_2$, an oxide of nickel, $RuO_2$, or a combination comprising at least one of the foregoing.

18. The composite photocatalyst of claim 16, wherein an amount of the co-catalyst in the composite photocatalyst is about 0.01 to about 10 weight percent, based on a total weight of the composite photocatalyst.

19. The composite photocatalyst of claim 15, wherein the mole fraction of $TiO_2$ nanoscale particles disposed on the surface of the CdS core is about 0.67.

20. A method of using a composite photocatalyst, comprising:
providing a composite photocatalyst that comprises a semiconducting core having a bandgap energy of less than or equal to 3.1 eV, and nanoscale particles that are electron carriers disposed on a surface of the semiconducting core, wherein absorption by the photocatalyst of visible light at a wavelength of greater than 400 nanometers generates photocatalytic activity;
introducing the composite photocatalyst to a liquid or gas medium that comprises a substance responsive to the photocatalytic activity of the composite photocatalyst; and
irradiating the gas or liquid medium including the composite photocatalyst with at least visible light to generate the photocatalytic activity of the composite photocatalyst.

21. The method of claim 20, wherein introducing the composite photocatalyst comprises introducing to the liquid or gas medium about 0.05 to about 10 grams of the composite photocatalyst per 25 square centimeters of area of the medium including the composite photocatalyst to be irradiated.

22. The method of claim 20, wherein introducing the composite photocatalyst comprises introducing the composite photocatalyst to water, and wherein irradiating the water including the composite photocatalyst with at least visible light is effective to produce hydrogen gas.

23. The method of claim 22, wherein introducing the composite photocatalyst to water comprises introducing the composite photocatalyst to water that further comprises a salt or a reducing agent.

24. The method of claim 20, wherein introducing the composite photocatalyst comprises introducing the composite photocatalyst to the liquid or gas medium that comprises a gaseous substance that decomposes or oxidizes in response to the photocatalytic activity of the composite photocatalyst.

25. The method of claim 20, wherein providing the composite photocatalyst comprises providing the composite photocatalyst further comprising a co-catalyst disposed on the surface of the semiconducting core, a surface of one or more of the nanoscale particles, or both, and wherein the co-catalyst comprises Ni, Pt, Rh, Ag, Ru, Pd, $IrO_2$, an oxide of nickel, $RuO_2$, or a combination comprising at least one of the foregoing.

26. The method of claim 20, wherein irradiating the gas or liquid medium comprises irradiating the gas or liquid medium including the composite photocatalyst with substantially only visible light having a wavelength greater than about 400 nanometers.

* * * * *